US009360064B2

(12) United States Patent
Nadig et al.

(10) Patent No.: US 9,360,064 B2
(45) Date of Patent: Jun. 7, 2016

(54) POWER TOOL BRAKING DEVICE

(75) Inventors: Peter Nadig, Goennheim (DE);
Sebastian Laber,
Leinfelden-Echterdingen (DE); Florian Esenwein, Leinfelden-Echterdingen (DE); Joachim Heizmann,
Immendingen (DE)

(73) Assignee: Robert Bosch GmbH, Stuttgart (DE)

( * ) Notice: Subject to any disclaimer, the term of this patent is extended or adjusted under 35 U.S.C. 154(b) by 358 days.

(21) Appl. No.: 13/882,024

(22) PCT Filed: Sep. 23, 2011

(86) PCT No.: PCT/EP2011/066589
§ 371 (c)(1),
(2), (4) Date: Jul. 13, 2013

(87) PCT Pub. No.: WO2012/055653
PCT Pub. Date: May 3, 2012

(65) Prior Publication Data
US 2013/0284551 A1    Oct. 31, 2013

(30) Foreign Application Priority Data

Oct. 29, 2010    (DE) .................. 10 2010 043 185

(51) Int. Cl.
*B60L 7/00*     (2006.01)
*F16D 63/00*    (2006.01)
*B23Q 11/00*    (2006.01)
(Continued)

(52) U.S. Cl.
CPC .......... *F16D 63/002* (2013.01); *B23Q 11/0092* (2013.01); *B24B 23/028* (2013.01); *B24B 47/26* (2013.01); *B25F 5/00* (2013.01);
(Continued)

(58) Field of Classification Search
CPC   F16D 63/002; B23Q 11/0092; B24B 23/028; B24B 47/26; B25F 5/00; H02K 7/106; H02K 7/145; H02K 7/104; H02P 3/04; B60L 7/28
USPC .......... 188/267, 158, 161, 164; 451/257, 358, 451/359, 363
See application file for complete search history.

(56) References Cited

U.S. PATENT DOCUMENTS 3,101,542 A * 8/1963 Fodor ............................ 433/105
4,517,505 A   5/1985 Cunningham
(Continued)

FOREIGN PATENT DOCUMENTS

CN    1086758 A    5/1994
CN    1088000 C    7/2002
(Continued)

OTHER PUBLICATIONS

International Search Report corresponding to PCT Application No. PCT/EP2011/066589, mailed May 21, 2012 (German and English language document) (7 pages).

*Primary Examiner* — Thomas J Williams
*Assistant Examiner* — Mariano Sy
(74) *Attorney, Agent, or Firm* — Maginot, Moore & Beck LLP

(57) ABSTRACT

A power tool braking device, in particular a portable power tool braking device, for a portable power tool has at least one magnetic field braking unit. The power tool braking device comprises at least one drive unit which has at least one drive element, on which at least one braking element of the magnetic field braking unit is arranged.

8 Claims, 8 Drawing Sheets

(51) Int. Cl.
*B24B 23/02* (2006.01)
*B24B 47/26* (2006.01)
*B25F 5/00* (2006.01)
*H02K 7/104* (2006.01)
*H02K 7/106* (2006.01)
*H02K 7/14* (2006.01)
*H02P 3/04* (2006.01)

(52) U.S. Cl.
CPC ............... *H02K 7/104* (2013.01); *H02K 7/106* (2013.01); *H02K 7/145* (2013.01); *H02P 3/04* (2013.01)

(56) References Cited

U.S. PATENT DOCUMENTS

| | | | |
|---|---|---|---|
| 4,674,235 A * | 6/1987 | Inoue | B24D 5/00 451/1 |
| 4,853,573 A | 8/1989 | Wolcott et al. | |
| 5,149,998 A | 9/1992 | Wolcott | |
| 5,337,862 A * | 8/1994 | Kuwahara | 188/158 |
| 5,392,568 A * | 2/1995 | Howard et al. | 451/357 |
| 5,444,318 A | 8/1995 | Stumpf | |
| 5,458,533 A * | 10/1995 | Barth et al. | 451/357 |
| 5,595,531 A | 1/1997 | Niemela et al. | |
| 5,879,111 A * | 3/1999 | Stock et al. | 408/6 |
| 8,596,427 B2 * | 12/2013 | Numata | 188/166 |
| 2012/0244788 A1 * | 9/2012 | Numata | 451/359 |
| 2013/0288581 A1 * | 10/2013 | Esenwein | 451/363 |
| 2014/0034434 A1 * | 2/2014 | Esenwein | 188/267 |
| 2014/0069756 A1 * | 3/2014 | Esenwein | 188/324 |
| 2014/0124307 A1 * | 5/2014 | Esenwein | 188/180 |
| 2014/0206265 A1 * | 7/2014 | Maute et al. | 451/358 |

FOREIGN PATENT DOCUMENTS

| | | |
|---|---|---|
| DE | 43 44 424 A1 | 6/1995 |
| DE | 195 10 291 A1 | 9/1996 |
| DE | 196 36 873 A1 | 3/1998 |
| DE | 199 32 578 A1 | 6/2000 |
| DE | 20 2005 007 459 U1 | 1/2006 |
| FR | 2 580 126 A1 | 10/1986 |
| GB | 2 455 528 A | 6/2009 |

* cited by examiner

POWER TOOL BRAKING DEVICE

This application is a 35 U.S.C. §371 National Stage Application of PCT/EP2011/066589, filed on Sep. 23, 2011, which claims the benefit of priority to Serial No. DE 10 2010 043 185.0, filed on Oct. 29, 2010 in Germany, the disclosures of which are incorporated herein by reference in their entirety.

BACKGROUND

A power tool braking device of a portable power tool having a magnetic field braking unit is already known from DE 199 32 578 B4.

SUMMARY

The disclosure relates to a power tool braking device, in particular a hand-held power tool braking device, of a portable power tool having at least one magnetic field braking unit.

It is proposed for the power tool braking device to comprise at least one output unit, which comprises at least one output element, on which at least one braking element of the magnetic field braking unit is arranged. Here, an "output unit" is to be understood in particular to mean a unit that can be driven by means of a drive unit and transfers forces and/or torques generated by the drive unit to a machining tool. Here, a "portable power tool" is to be understood in particular to mean a power tool, in particular a hand-held power tool, which can be transported by an operator without the use of a transport machine. In particular, the portable power tool has a mass that is less than 50 kg, preferably less than 20 kg and particularly preferably less than 10 kg. Here, a "magnetic field braking unit" is to be understood in particular to mean a braking unit, in particular an electromagnetic braking unit, which, by means of the use of a magnetic field, reduces and/or limits at least substantially in a frictionless manner a speed, in particular a rotational speed, of a moving component, in particular of a rotating component, compared to a working speed, in particular in addition to a purely friction-induced reduction and/or limitation as a result of a mounting of the component. Here, "reduce and/or limit substantially in a frictionless manner" is to be understood in particular to mean a braking of a component, which occurs in a manner free from frictional forces apart from mounting-induced frictional forces and/or flow-induced resistance forces. In particular, the component is braked by means of the magnetic field braking unit decoupled from a contact between the component and a friction lining of a braking element. In principle however, it is also conceivable for a friction braking unit coupled to or decoupled from the magnetic field brake to be provided in addition to the at least substantially frictionless magnetic field braking unit. Furthermore, the magnetic field braking unit is formed in particular as a magnetic field braking unit separate from the drive. Here, a "magnetic field braking unit separate from the drive" is to be understood in particular to mean a magnetic field braking unit that, decoupled from a magnetic field of an electric motor unit, brakes a component by means of a magnetic field. A stator and/or a rotor of the electric motor unit are preferably decoupled from the magnetic field of the magnetic field braking unit. The magnetic field braking unit is preferably provided to brake the component in particular in a period of time greater than 0.1 s, preferably greater than 0.5 s and particular preferably smaller than 3 s, starting from a working speed, in particular to brake the component to a speed that is less than 50% of the working speed, preferably less than 20% of the working speed and particularly preferably to brake the component to a speed of 0 m/s. Installation space can advantageously be saved by means of an arrangement of a braking element of the magnetic field braking unit on an output element of the output unit.

It is also proposed for the output unit to be formed as a bevel gear. Here, a "bevel gear" is to be understood in particular to mean a gear that comprises an output shaft arranged at an angle relative to an input shaft, wherein the axes of rotation of the input shaft and of the output shaft preferably have a common point of intersection. Here, "arranged at an angle" is to be understood in particular to mean an arrangement of one axis relative to a further axis, in particular of two intersecting axes, wherein the two axes enclose an angle deviating from 180°. An axis of rotation of the input shaft and an axis of rotation of the output shaft in an assembled state of the output unit formed as a bevel gear preferably enclose an angle of 90°. Here, an "input shaft" is to be understood in particular to mean a shaft that introduces forces and/or torques into the output unit formed as a bevel gear. In this case, the input shaft can be formed for example as an armature shaft of an electric motor unit of the drive unit, said armature shaft being formed with a pinion. Here, an "output shaft" is to be understood in particular to mean a shaft that transfers forces and/or torques for example to a machining tool connected in a rotationally engaged manner to the output shaft. In particular, "rotationally engaged" is to be understood in particular to mean a connection that transfers a torque and/or a rotational movement at least in a substantially unchanged manner. Here, "transfer in an at least substantially unchanged manner" is to be understood in particular to mean a complete transfer of forces and/or torques from one component to a further component apart from a loss caused by friction and/or tolerances. The magnetic field braking unit can be integrated into the output unit formed as a bevel gear in a constructionally simple manner. Furthermore, a relative movement of an output element for activation of the magnetic field braking unit can advantageously be utilized by means of the mechanical activation unit.

The magnetic field braking unit is preferably arranged along a flux of force, in particular a flux of force starting from an electric motor unit of the drive unit, at least partly behind an input gearwheel of the bevel gear. Here, an "input gearwheel" is to be understood in particular to mean a gearwheel that, when the bevel gear is assembled, is engaged with a gearwheel of the input shaft, in particular with a pinion of the armature shaft. It is also conceivable however for a braking element formed as a permanent magnet to be arranged on a side of a tool receptacle facing a machining tool and for the machining tool to comprise a braking element formed as an eddy current element and/or hysteresis element on a side facing the tool receptacle. A compact magnetic field braking unit, which advantageously can act on an output element in order to advantageously brake a deceleration of a machining tool can be achieved in a constructionally simple manner.

It is also proposed for the power tool braking device to comprise at least one mechanical activation unit. Here, a "mechanical activation unit" is to be understood in particular to mean a unit that, as a result of a relative movement, initiates a triggering process and/or an activation process, in particular of the magnetic field braking unit, wherein the relative movement is different from a pure switching movement of a switching element for generation of an electrical signal and in particular is formed by a movement of a magnet element and/or by an inertia-induced movement, in particular by an inertia-induced movement of a rotating drive element, output element and/or a machining tool. Here, in this context, a "triggering process" is to be understood in particular to mean a mechanical, electrical, magnetic and/or electronic signaling of a state that is provided to initiate an activation process. Here, an "activation process" is to be understood in particular to mean a mechanical, electrical, magnetic and/or electronic activation of the magnetic field braking unit for generation of forces and/or torques to brake a component. In this context, "provided" is to be understood in particular to mean specifically programmed, designed and/or equipped.

In a preferred embodiment of the power tool braking device according to the disclosure, the activation unit is provided to initiate the triggering process and the activation process as a result of the relative movement, in particular in a manner that is at least substantially undelayed over time. In this case, the activation unit may be provided, as a result of a relative movement, for example to signal a triggering process and to initiate an activation process of the magnetic field braking unit at least substantially at the same time. An embodiment of the mechanical activation unit with which a switch is actuated by the relative movement as a triggering process and an activation process is initiated subsequently to the triggering process by means of an actuator and/or a spring force and/or by means of other actuation elements appearing appropriate to a person skilled in the art, is likewise conceivable. Furthermore, it is likewise conceivable for the activation unit to comprise a sensor unit, which senses the relative movement and consequently initiates a triggering process, wherein the activation process is initiated for example by means of an actuator.

A further embodiment of the power tool braking device may consist in the fact that the activation unit is mechanically, electrically, magnetically and/or electronically connected to an electromagnet of the magnetic field braking unit, wherein the electromagnet is provided to influence a magnetic field of the magnetic field braking unit in at least one operating mode. The electromagnet may generate a magnetic field that is additional to an existing magnetic field of the magnetic field braking unit. In this case, it is conceivable for the additional magnetic field in one operating mode to at least partly compensate at least magnetic forces of the existing magnetic field of the magnetic field braking unit and/or in a braking mode to at least partly attenuate said magnetic forces, at least compared to a strength of the magnetic force of the magnetic field. The electromagnet of the magnetic field braking unit may advantageously likewise be provided during start-up of an electric motor unit of the portable power tool in an operating mode to enable an additional torque to reach a working rotational speed of the electric motor unit in a short period of time, for example preferably to achieve a boost operation. The magnetic field braking unit can advantageously be reliably triggered and/or activated by means of the mechanical activation unit. Furthermore, in a preferred embodiment of the power tool braking device according to the disclosure, it is advantageously possible to dispense with electrical components for triggering and/or activating the magnetic field braking unit. The susceptibility to faults of the magnetic field braking unit can thus advantageously be kept low.

The electromagnet of the magnetic field braking unit may advantageously likewise be provided during start-up of an electric motor unit of the portable power tool in an operating mode to enable an additional torque to reach a working rotational speed of the electric motor unit in a short period of time, for example preferably to achieve a boost operation. The magnetic field braking unit can advantageously be reliably triggered and/or activated by means of the mechanical activation unit. Furthermore, in a preferred embodiment of the power tool braking device according to the invention, it is advantageously possible to dispense with electrical components for triggering and/or activating the magnetic field braking unit. The susceptibility to faults of the magnetic field braking unit can thus advantageously be kept low.

Furthermore, it is proposed for the activation unit to change at least one characteristic of a magnetic field of the magnetic field braking unit as a result of a relative movement. Here, a "characteristic of a magnetic field" is to be understood in particular to mean a parameter that defines a magnetic field, such as a magnetic flux, a magnetic field strength, a magnetic resistance, a magnetomotive force, etc. Here, the term "change" is to define in particular an "adjustment" and/or "influence". The relative movement is preferably a relative movement of two components of an output unit, a drive unit and/or of two braking elements of the magnetic field braking unit. The magnetic field braking unit can advantageously be adjusted as a result of the relative movement. Furthermore, the magnetic field braking unit can advantageously be activated as a result of a relative movement of two components mounted so as to be movable relative to one another.

The magnetic field braking unit preferably comprises at least one braking element, which is formed as a permanent magnet. It is also conceivable however for the magnetic field braking unit in an alternative embodiment to comprise a braking element formed as a coil for generation of a magnetic field. The magnetic field braking unit particularly preferably comprises at least two braking elements, which are formed as permanent magnets. The two braking elements formed as permanent magnets are preferably mounted so as to be movable relative to one another, and in particular are mounted so as to be rotatable relative to one another. The permanent magnets are preferably formed from rare-earth magnets, such as neodymium iron boron (NdFeB), samarium cobalt (SmCo), etc. It is also conceivable however to form the permanent magnets from another material appearing appropriate to a person skilled in the art. The permanent magnets are preferably annular. Furthermore, the permanent magnets comprise angular segments preferably arranged along a circumferential direction, said angular segments having alternating polarity along the circumferential direction. A magnetic field braking unit can be achieved in a constructionally simple manner. Furthermore, a magnetic field braking unit independent of a power supply can advantageously be achieved.

It is also proposed for the activation unit to change a pole position of the permanent magnet relative to a further braking element of the magnetic field braking unit, said further braking element being formed as a permanent magnet. Here, the expression "change pole position" is to define in particular a change of a position of poles of the permanent magnet relative to poles of the further permanent magnet. The permanent magnets are preferably rotated relative to one another about an axis, in particular by an angle corresponding to a pole pitch of the permanent magnets. A "pole pitch" is to be understood in particular to mean a division of a path, in particular of a circumference of 360°, of the permanent magnets into pole segments arranged in succession along a direction, in particular the circumferential direction, in particular into angular segments having a polarity, wherein the pole segments have an alternating polarity relative to one another along the direction. The poles are preferably arranged offset from one another along the circumferential direction. In this case, the poles are preferably arranged adjacently. It is also conceivable however for the poles to be arranged at a distance from one another, in particular as considered along the circumferential direction. A change to the magnetic field, which is provided to brake a moving component, can be produced in a constructionally simple manner.

The magnetic field braking unit is advantageously formed as an eddy current brake. Here, an "eddy current brake" is to be understood in particular to mean a brake that uses the eddy current losses of a metal element moved in a magnetic field to brake the element. To form the magnetic field braking unit as an eddy current brake, an actuator disk formed from an electrically advantageously conductive material, such as copper and/or aluminum, is preferably arranged between the at least two permanent magnets. Here, the term "between" is to be understood in particular to mean a spatial arrangement with which components are arranged in succession at least along one axis and overlap one another at least in part as viewed along the axis. A magnetic field braking unit can advantageously be achieved in a cost-effective manner.

In an alternative embodiment of the power tool braking device according to the disclosure, the magnetic field braking unit is formed as a hysteresis brake. Here, a "hysteresis brake" is to be understood in particular to mean a brake that generates a braking force and/or a braking torque by means of a reversal of the magnetic polarity of an element moving in a magnetic field, in particular of a ferromagnetic element. To form the magnetic field braking unit as a hysteresis brake, a braking element of the magnetic field braking unit formed from a ferromagnetic material is preferably arranged between the at least two permanent magnets. A magnetic field braking unit with a long service life can advantageously be achieved.

In an alternative embodiment of the power tool braking device according to the disclosure, it is conceivable for the power tool braking device to additionally comprise at least one drive unit. The drive unit comprises at least one drive element, on which at least one braking element of the magnetic field braking unit is arranged. Here, a "drive unit" is to be understood in particular to mean a unit that comprises at least one electric motor unit and that is provided to generate driving forces and/or driving torques by means of an energy conversion, in particular a conversion of electrical energy into mechanical energy. The drive unit is preferably coupled to an output unit in order to transfer the driving forces and/or the driving torques to a machining tool for machining a workpiece. A compact magnetic field braking unit can advantageously be achieved by means of an arrangement of a braking element of the magnetic field braking unit on a drive element of the drive unit. The drive element, on which the braking element is arranged at least in part, is advantageously formed as an armature shaft. Here, an "armature shaft" is to be understood in particular to mean a shaft, on which at least one magnetizable unit of the electric motor unit and/or a pinion for transferring forces and/or torques is arranged. The braking element is particularly preferably connected in a rotationally engaged manner to the armature shaft. It is also conceivable however for the braking element to be arranged on a shaft that is coupled in a rotationally engaged manner to the armature shaft, in particular by means of a releasable coupling. A high efficiency of the magnetic field braking unit can advantageously be achieved. The braking element is preferably arranged on a side of the drive unit facing away from a driving side. Here, a "driving side" is to be understood in particular to mean a side of the drive unit that faces an output unit along an axis of rotation of the drive unit, in particular of the armature shaft of the electric motor unit, and/or on which a pinion of the drive unit is arranged, said pinion being engaged with a gearwheel of an output unit. It is also conceivable however for the braking element to be arranged on the driving side of the drive unit. Installation space that is already present can advantageously be utilized. Furthermore, a cooling air flow generated by a fan unit arranged on the driving side can be achieved in order to cool the drive unit, said cooling air flow being decoupled from a development of heat of the magnetic field braking unit.

In a further alternative embodiment, it is also conceivable for the magnetic field braking unit to be formed as an assembly module. Here, the expression "assembly module" is to define in particular a design of a unit, with which a plurality of components are preassembled and the unit is assembled as a whole in an overall system, in particular in a portable power tool. The assembly module preferably has at least one fastening element, which is provided to releasably connect the assembly module to the overall system. The assembly module can advantageously be disassembled from the overall system in particular with less than 10 fastening elements, preferably with less than 8 fastening elements and particularly preferably with less than 5 fastening elements. The fastening elements are particularly preferably formed as screws. It is also conceivable however for the fastening elements to be formed as other elements appearing appropriate to a person skilled in the art, such as quick-action elements, fastening elements that can be actuated without a tool, etc. At least one function of the assembly module, in particular a change of the pole position of the permanent magnet for activation of the magnetic field braking unit, can preferably be ensured in a state disassembled from the overall system. The assembly module can particularly preferably be disassembled by an end user. The assembly module is thus formed as an exchangeable unit, which can be exchanged for a further assembly module, for example in the event of a defect of the assembly module or a functional extension and/or function change of the overall system. A broad spectrum of use of the magnetic field braking unit can advantageously be achieved by means of an embodiment of the magnetic field braking unit as an assembly module. Integration into existing portable power tools can also be achieved in a constructionally simple manner. Furthermore, production costs can thus advantageously be kept low.

The disclosure also relates to a portable power tool, in particular a portable hand-held power tool, comprising a power tool braking device according to the disclosure, in particular comprising a hand-held power tool braking device. The portable power tool can be formed in this case as an angle grinder, as a drill, as a hand-held circular saw, as a chisel hammer and/or as a hammer drill, etc. A safety function can advantageously be achieved for an operator of the portable power tool.

BRIEF DESCRIPTION OF THE DRAWINGS

Further advantages will emerge from the following description of the drawings. Exemplary embodiments of the disclosure are illustrated in the drawings. The drawings, the description and the claims contain numerous features in combination. A person skilled in the art will expediently also consider the features individually and combine them to form appropriate further combinations.

In the drawings.

DETAILED DESCRIPTION

Figure 1:
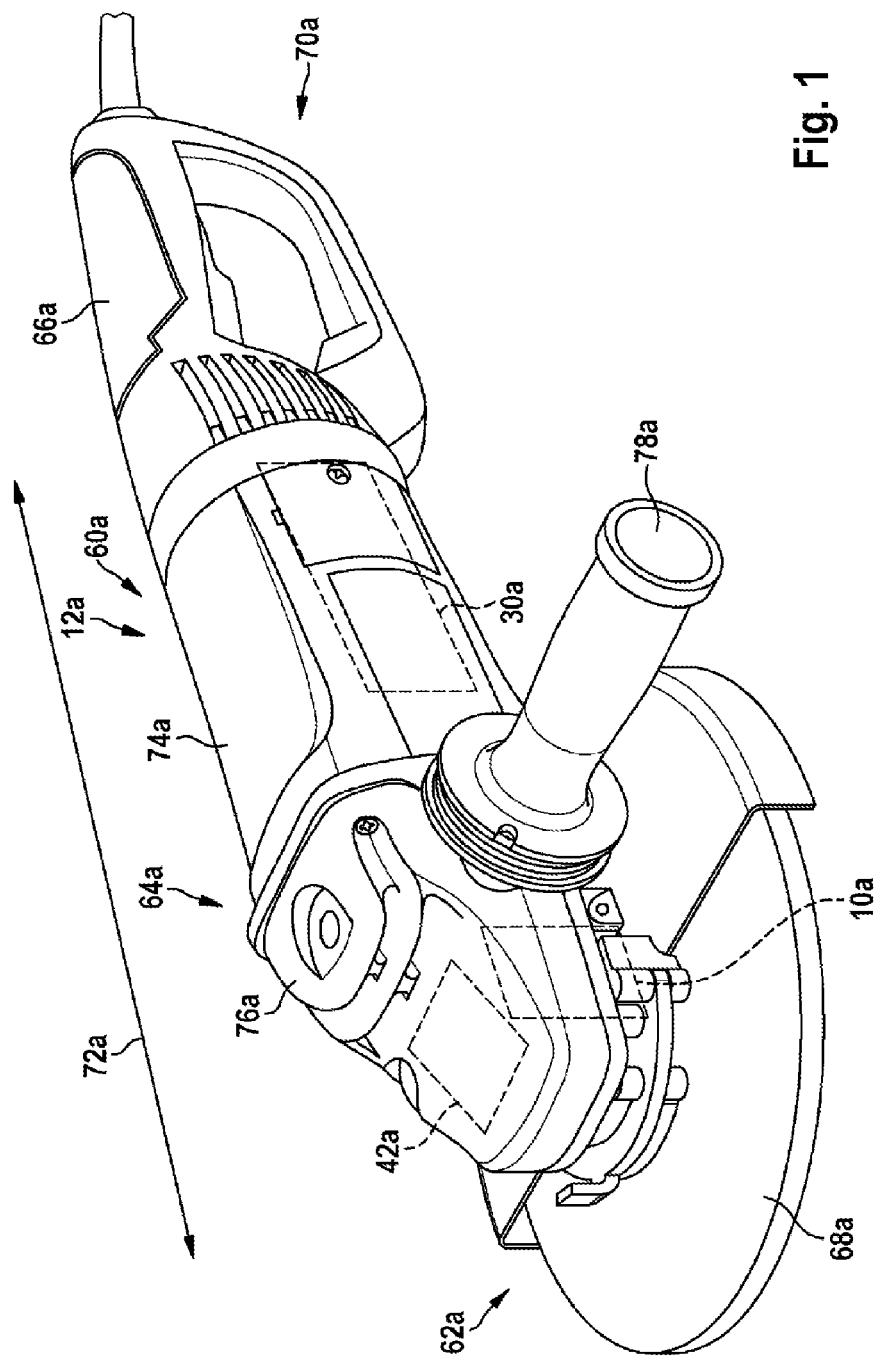
FIG. 1 shows a schematic illustration of a power tool according to the disclosure having a power tool braking device according to the disclosure.

FIG. 1 shows a portable power tool 12a formed as an angle grinder 60a having a power tool braking device 10a. The angle grinder 60a comprises a protective hood unit 62a, a power tool housing 64a and a primary grip 66a, which extends on a side 70a of the power tool housing 64a facing away from a machining tool 68a in the direction of a primary direction of extension 72a of the angle grinder 60a. In this case, the machining tool 68a is formed as a grinding wheel. It is also conceivable however for the machining tool 68a to be formed as an abrasive cutoff wheel or polishing wheel. The power tool housing 64a comprises a motor housing 74a for receiving a drive unit 30a of the angle grinder 60a and a gear housing 76a for receiving an output unit 42a of the power tool braking device 10a. The drive unit 30a is provided to drive the machining tool 68a in a rotating manner via the output unit 42a. The output unit 42a is connected to the drive unit 30a via a drive element 32a of the drive unit 30a, said drive element being driven in rotation about an axis of rotation 56a.

Figure 2:
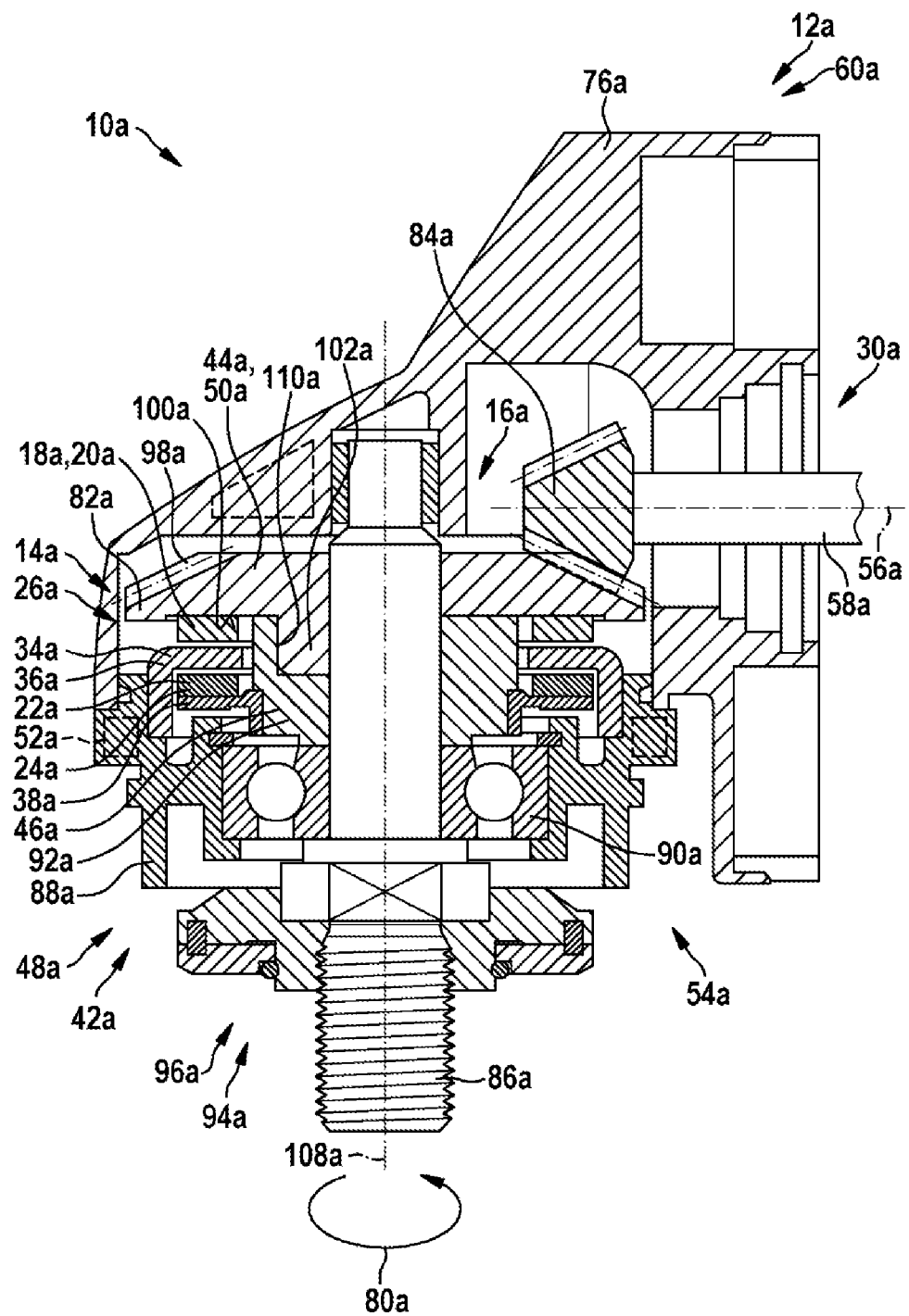
FIG. 2 shows a schematic illustration of a detailed view of the power tool braking device from FIG. 1.

The drive element 32a is formed as an armature shaft 58a (FIG. 2). An additional grip 78a is arranged on the gear housing 76a. The additional grip 78a extends transversely with respect to the primary direction of extension 72a of the angle grinder 60a.

The power tool braking device 10a is arranged in a gear housing 76a of the angle grinder 60a. The power tool braking device 10a also comprises a magnetic field braking unit 14a and a mechanical activation unit 16a (FIG. 2). The activation unit 16a is provided to change a characteristic of a magnetic field of the magnetic field braking unit 14a as a result of a relative movement. Furthermore, the power tool braking device 10a comprises the output unit 42a, which comprises an output element 44a, on which at least one braking element 18a of the magnetic field braking unit 14a is arranged, said braking element being formed as a first permanent magnet 20a. The output unit 42a is formed as a bevel gear 48a, which is coupled to a drive unit 30a of the angle grinder 60a for torque transfer. The magnetic field braking unit 14a is arranged after an input gearwheel 50a of the bevel gear 48a along a flux of force starting from the drive unit 30a. In this case, the output element 44a is formed as a crown gear 82a. The crown gear 82a is engaged with a pinion 84a of the drive unit 30a in an assembled state of the power tool braking device 10a. The input gearwheel 50a is thus formed by the crown gear 82a.

The output unit 42a further comprises a rotatably mounted spindle 86a, a bearing flange 88a, a bearing element 90a arranged in the bearing flange 88a, and an output element 46a, which is coupled in a rotationally engaged manner to the spindle 86a and is formed as an entraining element 92a. The crown gear 82a is arranged on the spindle 86a by means of a clearance fit. The bearing flange 88a is releasably connected to the gear housing 76a by means of fastening elements (not illustrated here in greater detail) of the output unit 42a. Furthermore, a machining tool 68a can be connected in a rotationally engaged manner to the spindle 86a by means of a fastening element (not illustrated here in greater detail) for machining of a workpiece. The machining tool 68a can thus be driven rotatingly during operation of the angle grinder 60a. The power tool braking device 10a further comprises a detachment protection unit 94a, which is provided to prevent detachment of the machining tool 68a and/or of the fastening element from the spindle 86a in a braking mode. The detachment protection unit 94a is formed in this case as a receiving flange 96a, which is connected in a rotationally engaged manner to the spindle 86a by means of an interlocked connection. It is also conceivable however for the receiving flange 96a to be connected in a rotationally engaged manner to the spindle 86a by means of other connection types appearing appropriate to a person skilled in the art.

Figure 3:
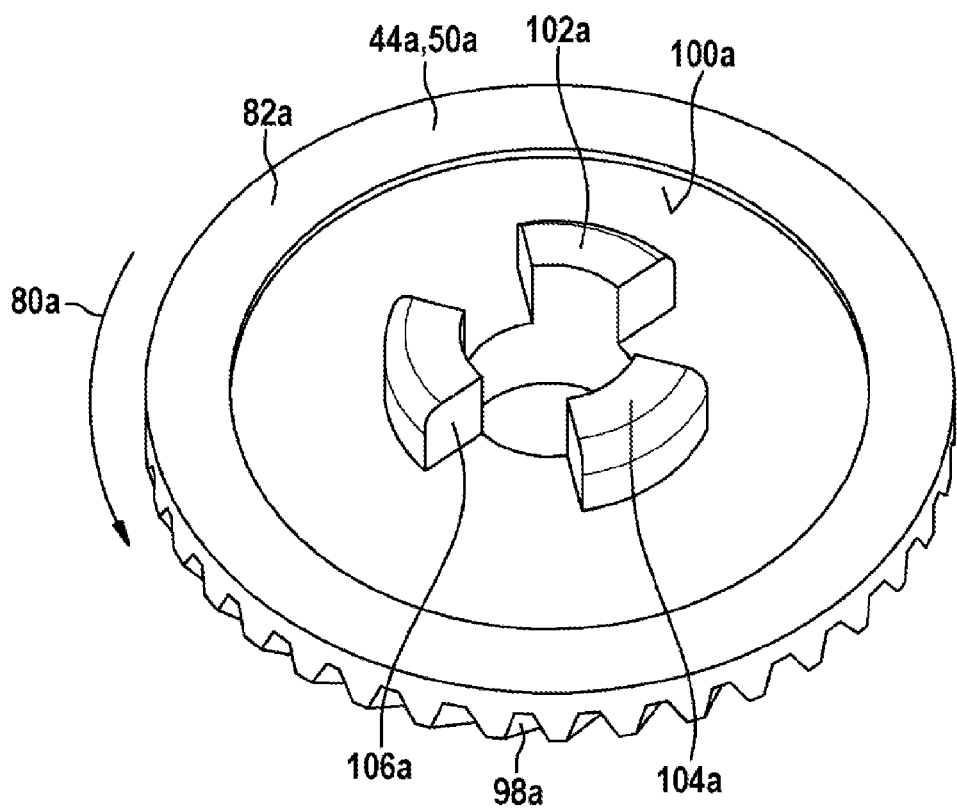
FIG. 3 shows a schematic illustration of a detailed view of an output element of an output unit of a magnetic field braking unit of the power tool braking device from FIG. 2.

FIG. 3 shows a detailed view of the crown gear 82a of the output unit 42a. The crown gear 82a is formed from a magnetically conductive material, for example from a ferromagnetic material. A magnetic field in the region of the crown gear 82a can thus be intensified and leakage fluxes can be kept low. Furthermore, the crown gear 82a comprises three rotation-entraining elements 102a, 104a, 106a on a side 100a of the crown gear 82a facing away from a toothing 98a of the crown gear 82a. It is also conceivable however for the crown gear 82a to comprise a number of rotation-entraining elements 102a, 104a, 106a differing from three. A person skilled in the art will provide a suitable number of rotation-entraining elements 102a, 104a, 106a on the crown gear 82a depending on the field of application. The rotation-entraining elements 102a, 104a, 106a are distributed uniformly along a circumferential direction 80a on the side 100a of the crown gear 82a facing away from the toothing 98a. The circumferential direction 80a extends in this case in a plane running perpendicular to an axis of rotation 108a of the crown gear 82a. The crown gear 82a rotates during operation about the axis of rotation 108a in order to transfer torques onto the machining tool 68a. Furthermore, the rotation-entraining elements 102a, 104a, 106a extend perpendicularly with respect to the side 100a of the crown gear 82a facing away from the toothing 98a. In an assembled state of the output unit 42a, the rotation-entraining elements 102a, 104a, 106a extend in the direction of the entraining element 92a (FIG. 2).

Figure 4:
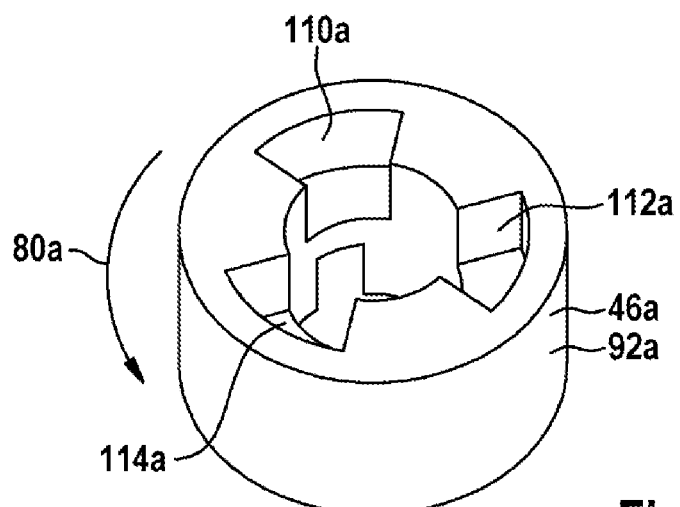
FIG. 4 shows a schematic illustration of a detailed view of a further output element of the output unit of the magnetic field braking unit of the power tool braking device from FIG. 2.

FIG. 4 shows a detailed view of the entraining element 92a. The entraining element 92a comprises rotation-entraining recesses 110a, 112a, 114a in order to receive the rotation-entraining elements 102a, 104a, 106a. In an assembled state, the rotation-entraining elements 102a, 104a, 106a thus extend along the axis of rotation 108a of the crown gear 82a into the rotation-entraining recesses 110a, 112a, 114a. The rotation-entraining recesses 110a, 112a, 114a are arranged on the entraining element 92a, distributed uniformly along the circumferential direction 80a. Furthermore, the rotation-entraining recesses 110a, 112a, 114a along the circumferential direction 80a have a greater extension compared to the rotation-entraining elements 102a, 104a, 106a. A rotational play is achieved between the crown gear 82a and the entraining element 92a along the circumferential direction 80a. The rotational play is formed by an angular range, through which the crown gear 82a can be rotated relative to the entraining element 92a. In this case, the angular range is formed by a circular circumference of 360°, divided by the number of poles of the permanent magnets 20a, 22a. The rotation-entraining elements 102a, 104a, 106a can thus be moved along the circumferential direction 80a into the rotation-entraining recesses 110a, 112a, 114a relative to edge regions of the rotation-entraining recesses 110a, 112a, 114a. When the rotation-entraining elements 102a, 104a, 106a bear against edge regions of the rotation-entraining recesses 110a, 112a, 114a, the entraining element 92a couples the crown gear 82a in a rotationally engaged manner to the spindle 86a. The relative movement of the crown gear 82a relative to the entraining element 92a is utilized by the activation unit 16a to change a characteristic of a magnetic field of the magnetic field braking unit 14a. It is also conceivable however for the rotation-entraining elements 102a, 104a, 106a to be arranged on the entraining element 92a, and for the rotation-entraining recesses 110a, 112a, 114a to be arranged on the crown gear 82a. The rotation-entraining elements 102a, 104a, 106a of the crown gear 82a and the rotation-entraining recesses 110a, 112a, 114a of the entraining elements 92a form the mechanical activation unit 16a.

Figure 5:
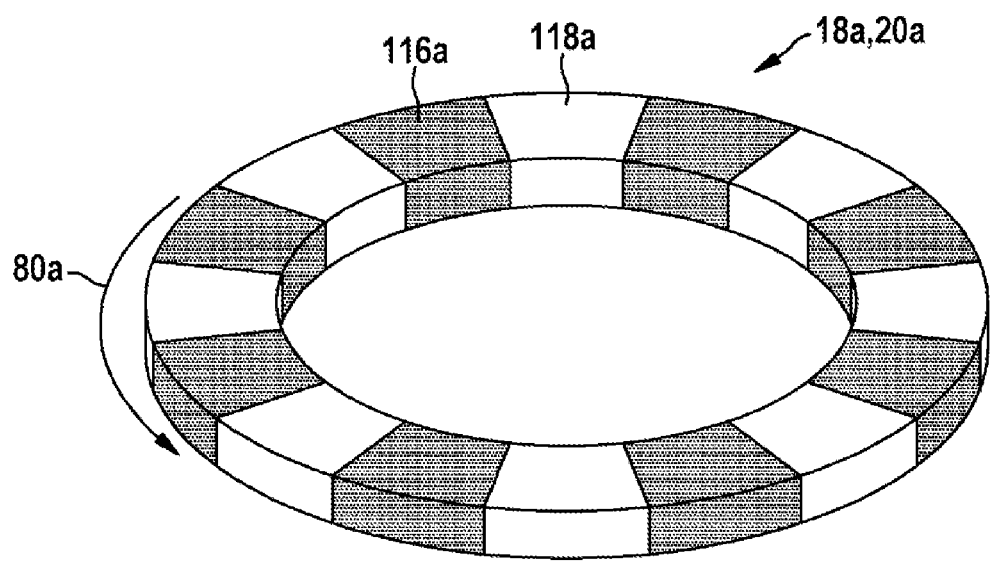
FIG. 5 shows a schematic illustration of a detailed view of a braking element, formed as a permanent magnet, of the magnetic field braking unit of the power tool braking device according to the disclosure.

The first permanent magnet 20a connected in a rotationally engaged manner to the crown gear 82a is annular (FIG. 5). The first permanent magnet 20a is arranged on the side 100a of the crown gear 82a facing away from the toothing 98a. Furthermore, the first permanent magnet 20a comprises angular segments 116a, 118a distributed uniformly along the circumferential direction 80a. The angular segments 116a, 118a have an alternating polarity relative to one another along the circumferential direction 80a. The polarities alternate continuously along the circumferential direction 80a between magnetic North Pole and magnetic South Pole. The magnetic field braking unit 14a comprises a further braking element 24a formed as a second permanent magnet 22a. The second permanent magnet 22a is annular and comprises angular segments (not illustrated here in greater detail) distributed uniformly along the circumferential direction 80a. Furthermore, the second permanent magnet 22a is arranged in a rotationally engaged manner on the entraining element 92a by means of an interference element 38a. The interference element 38a is provided to intensify a magnetic field of the magnetic field braking unit 14a in the region of the magnetic field braking unit 14a and to keep leakage fluxes low.

Furthermore, the magnetic field braking unit 14a comprises a further braking element 34a, which is formed as an eddy current element 36a. The magnetic field braking unit 14a is thus formed as an eddy current brake 26a. The eddy current element 36a is formed from an electrically conductive material, such as aluminum and/or copper. The eddy current element 36a is also arranged axially between the first permanent magnet 20a and the second permanent magnet 22a along the axis of rotation 108a of the crown gear 82a. The eddy current element 36a is fixedly connected to the bearing flange 88a. The first permanent magnet 20a and the second permanent magnet 22a are thus moved relative to the eddy current element 36a by means of the spindle 86a during operation of the angle grinder 60a. To avoid a magnetic short circuit, the entraining element 92a and the spindle 86a are formed from an unmagnetizable material, such as stainless steel, etc.

The magnetic field braking unit 14a is in a braking mode in a rest state of the angle grinder 60a. In the braking mode, oppositely directed polarities of the angular segments 116a, 118a of the first permanent magnet 20a and of the angular segments of the second permanent magnet 22a are arranged opposite one another, as considered along the axis of rotation 108a of the crown gear 82a. When starting up the angle grinder 60a by energizing an electric motor unit of the drive unit 30a, the crown gear 82a is driven by the pinion 84a. In this case, the crown gear 82a is rotated relative to the entraining element 92a about the axis of rotation 108a until the rotation-entraining elements 102a, 104a, 106a bear against edge regions of the rotation-entraining recesses 110a, 112a, 114a. The crown gear 82a is thus coupled in a rotationally engaged manner to the spindle 86a. The spindle 86a is consequently driven rotatingly. The machining tool 68a fastened to the spindle 86a is thus likewise driven rotatingly. During operation of the angle grinder 60a, low magnetic forces act on the eddy current element 36a. To reduce the magnetic forces, it is also conceivable for the permanent magnets 20a, 22a, in addition to the rotation relative to one another by means of the activation unit 16a, to be moved in translation along the axis of rotation 108a relative to one another. In this case, a distance between the permanent magnets 20a, 22a can be changed. For example, a groove on the spindle 122a may be provided, said groove having a mathematically defined incline along the axis of rotation 108a. For example, a lifting element could engage in the groove. As a result of a relative movement about the axis of rotation 108a of the crown gear 82a, the first permanent magnet 20a could be moved relative to the second permanent magnet 22a in a direction directed away from the entraining element 92a.

The first permanent magnet 20a is rotated between the crown gear 82a and the entraining element 92a relative to the second permanent magnet 22a as a result of the relative movement. The magnetic field braking unit 14a is thus switched into an operating mode, in which low magnetic forces of the magnetic field braking unit 14a act on the eddy current element 36a. When transferring from a braking mode into an operating mode, the activation unit 16a changes a pole position of the first permanent magnet 20a relative to the second permanent magnet 22a of the magnetic field braking unit 14a. In the operating mode, like-directed polarities of the angular segments 116a, 118a of the first permanent magnet 20a and of the angular segments of the second permanent magnet 22a are arranged opposite one another, as considered along the axis of rotation 108a of the crown gear 82a.

When the angle grinder 60a is switched off, the pinion 84a is braked by the electric motor unit. The machining tool 68a fastened on the spindle 86a continues to rotate as a result of an inertia. The spindle 86a thus likewise continues to be rotated about the axis of rotation 108a. Compared to the pinion 84a, the machining tool 68a has greater moments of inertia. The pinion 84a thus brakes the crown gear 82a. The crown gear 82a is rotated relative to the entraining element 92a about the axis of rotation 108a until the rotation-entraining elements 102a, 104a, 106a bear against edge regions of the rotation-entraining recesses 110a, 112a, 114a. In this case, the magnetic field braking unit 14a is switched into a braking mode. The two permanent magnets 20a, 22a are rotated relative to one another. In this case, the first permanent magnet 20a is rotated relative to the second permanent magnet 22a until oppositely directed polarities of the angular segments 116a, 118a of the first permanent magnet 20a and of the angular segments of the second permanent magnet 22a are arranged opposite one another, as considered along the axis of rotation 108 of the crown gear 82a. A voltage is thus induced in the eddy current element 36a. The induced voltage causes a flow of current in a swirling manner, perpendicularly to a magnetic flux of the magnetic field braking unit 14a. In this case, eddy currents are formed. The eddy currents generate a magnetic field in the eddy current element 36a, said magnetic field counteracting a magnetic field of the permanent magnets 20a, 22a. A braking torque is thus generated, which brakes the permanent magnets 20a, 22a rotating with the spindle 86a relative to the eddy current element 36a. The spindle 86a and the machining tool 68a are thus likewise braked. A strength of the magnetic field of the magnetic field braking unit 14a and therefore a propagation of a magnetic flux of the magnetic field braking unit 14a for generation of the braking torque is dependent on a distance along the axis of rotation 108a between the first permanent magnet 20a and the second permanent magnet 22a and a pole position along the circumferential direction 80a of the first permanent magnet 20a and of the second permanent magnet 22a relative to one another.

Figure 6:
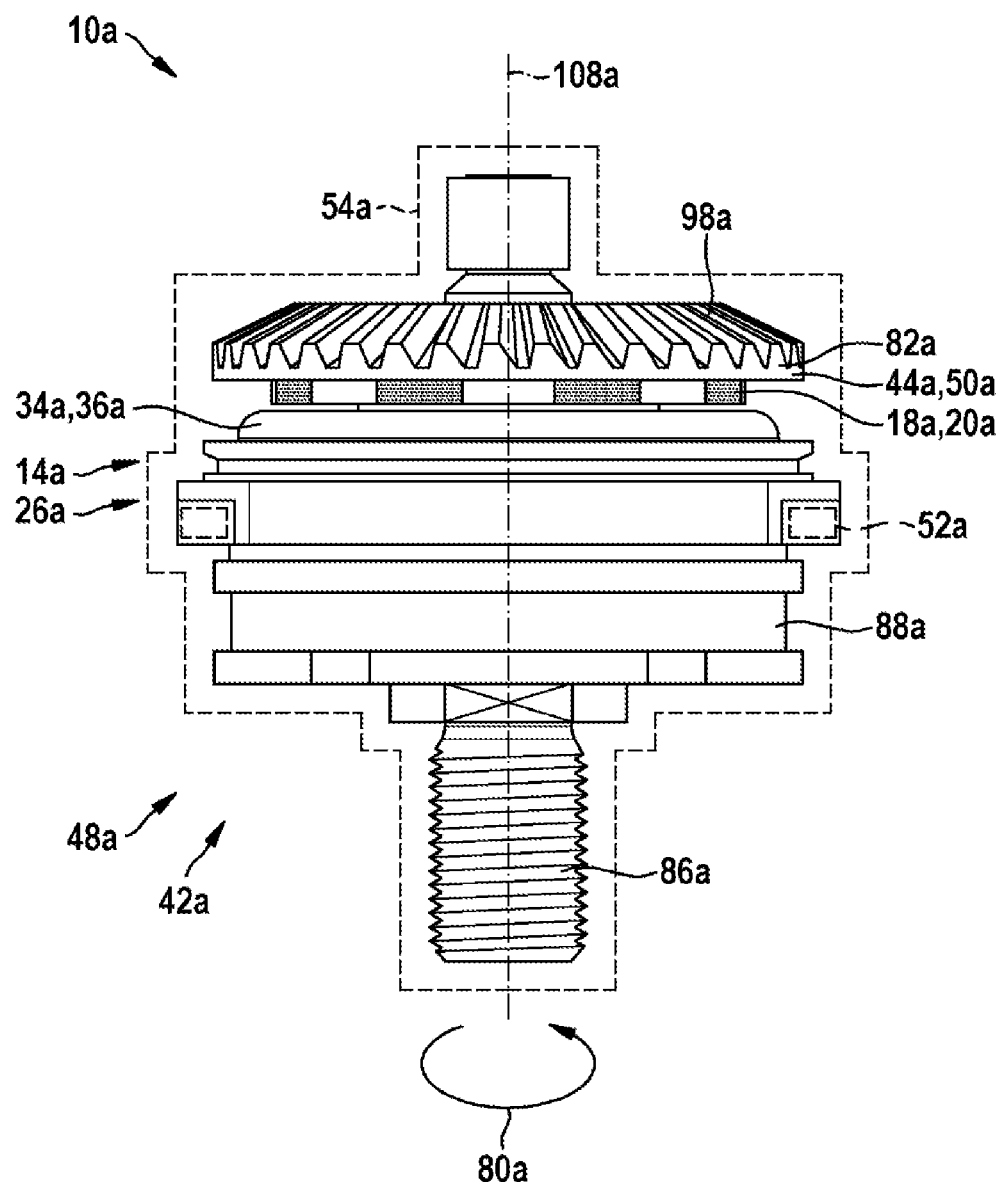
FIG. 6 shows a schematic illustration of a detailed view of the magnetic field braking unit formed as an assembly module for assembly on the power tool FIG. 1.
Figure 7:
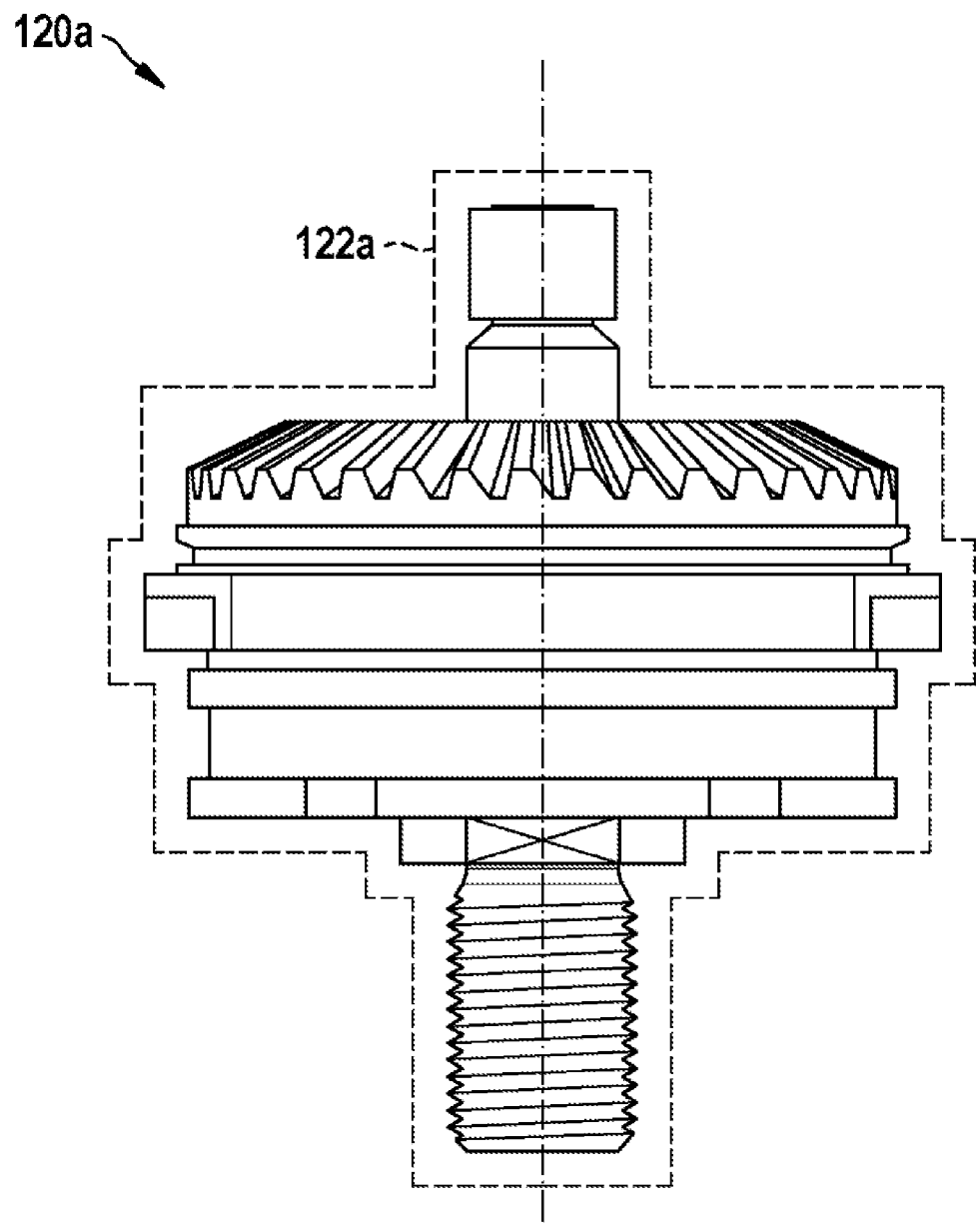
FIG. 7 shows a schematic illustration of a detailed view of an additional assembly module for alternative assembly on the power tool from FIG. 1.

Furthermore, the magnetic field braking unit 14a is formed together with the activation unit 16a and the output unit 42a as an assembly module 54a (FIG. 6). The assembly module 54a thus forms the power tool braking device 10a. The assembly module 54a comprises four fastening elements (not illustrated here) formed as screws. The screws are provided to releasably connect the assembly module 54a to the transmission housing 76a. An operator can disassemble the assembly module 54a from the gear housing 76a as required. The angle grinder 60a and the power tool braking device 10a thus form a power tool system. The power tool system comprises a further assembly module 120a. The further assembly module 120a comprises an output unit 122a formed as a bevel gear. The further assembly module 120a can be assembled by the operator on the gear housing 76a alternatively to the assembly module 54a. An operator thus has the option of equipping the angle grinder 60a with an assembly module 54a having a magnetic field braking unit 14a, an activation unit 16a and an output unit 42a, or with an assembly module 120a having an output unit 122a. For an application in which the angle grinder 60a is to be operated in a manner decoupled from the power tool braking device 10a, the assembly module 54a can be replaced by an operator by the further assembly module 120a of the power tool system. To this end, the operator merely disassembles the assembly module 54a from the gear housing 76a and assembles the further assembly module 120a on the gear housing 76a.

In an alternative embodiment of the power tool braking device 10a, it is conceivable for the power tool braking device 10a, in addition to the magnetic field braking unit 14a, to have a further magnetic field braking unit, which is arranged in a motor housing 74a of the angle grinder 60a. In this case, the power tool braking device 10a could comprise the drive unit 30a, which comprises a drive element, on which a braking element of the further magnetic field braking unit is arranged. It is also conceivable for the power tool braking device 10a to comprise a cooling unit, which is provided to dissipate heat generated by the magnetic field braking unit 14a in the braking mode as a result of an internal friction of the eddy current element 36a. It is also conceivable for the magnetic field braking unit 14a to comprise an electromagnet 52a (illustrated here in a dashed manner). The electromagnet 52a may be provided, during a start-up of the drive unit 30a, to enable an additional torque in order to reach a working rotational speed of the electric motor unit within a short period of time, for example preferably to achieve a boost operation. It is also conceivable however for the electromagnet 52a to be provided to amplify a magnetic field of the permanent magnet 20a, 22a. A strong braking torque for braking the eddy current element 36a can thus be achieved. In this case, the electromagnet 52a can be coupled for example to a safety unit (not illustrated here), which activates the electromagnet 52a for example if a machining tool 68a ruptures, in order to prevent continued rotation of a spindle of the angle grinder 60a or to brake said spindle.

Figure 8:
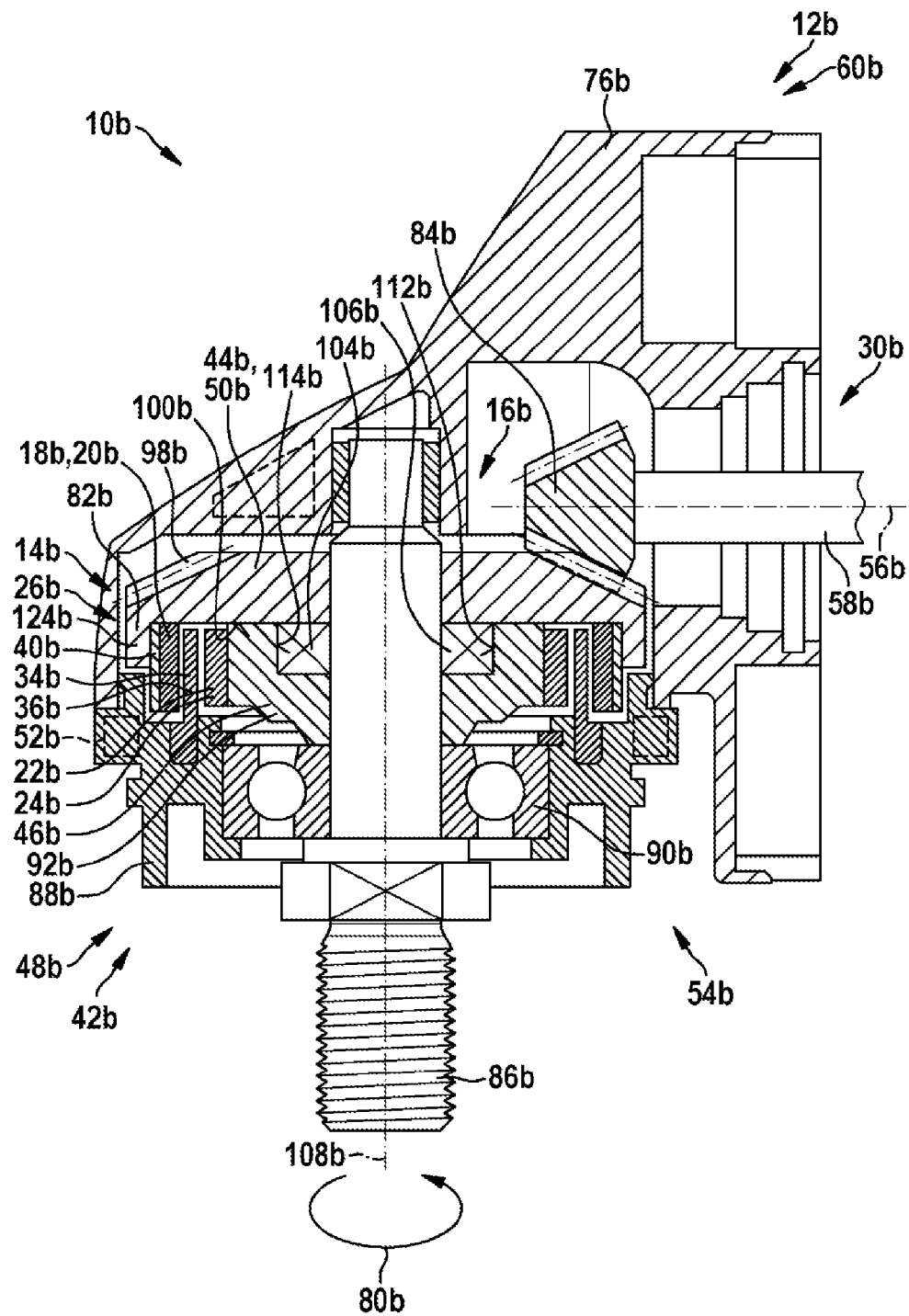
FIG. 8 shows a schematic illustration of a detailed view of an alternative embodiment of a power tool braking device according to the disclosure.
Figure 9:
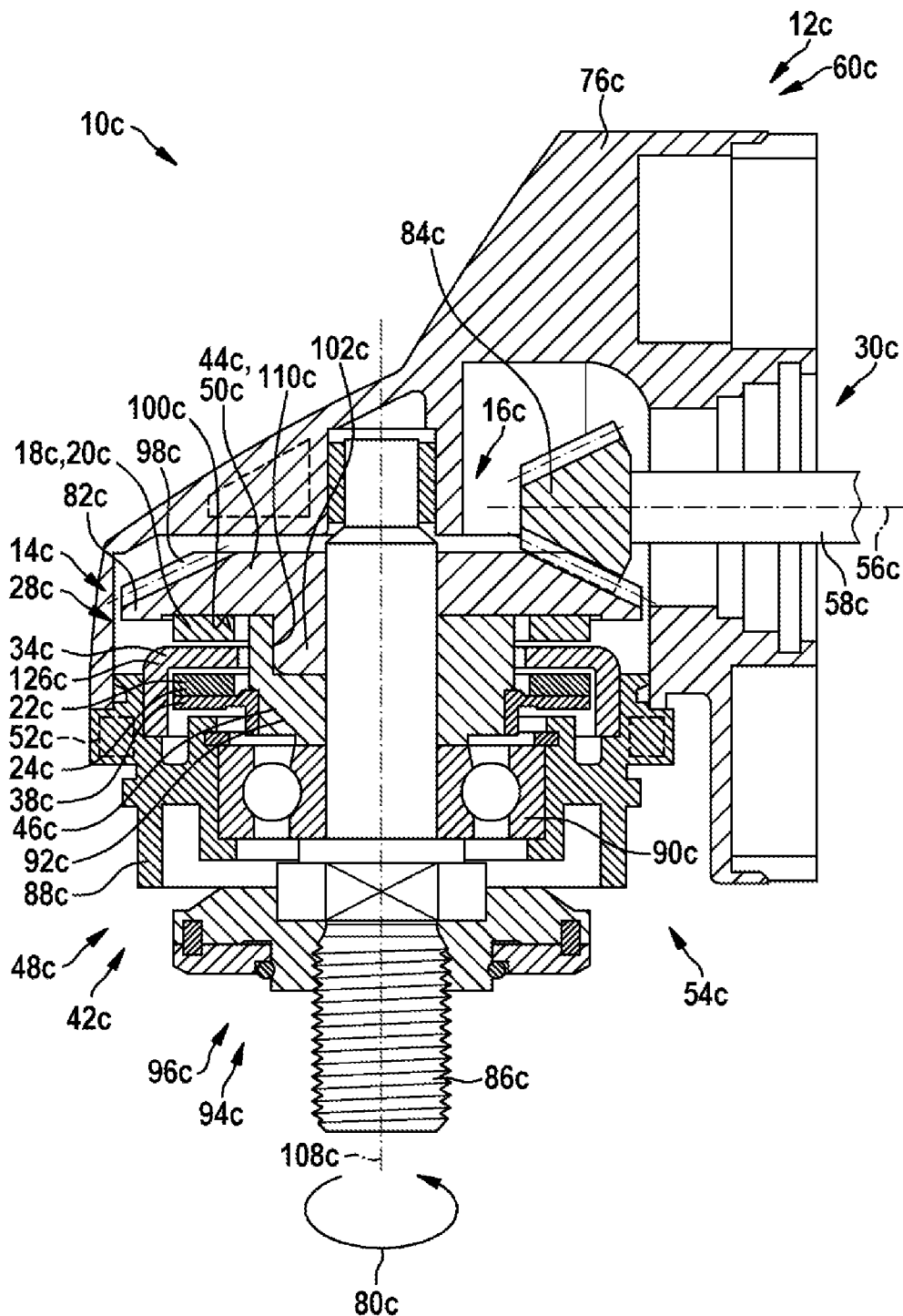
FIG. 9 shows a schematic illustration of a detailed view of a further alternative embodiment of a power tool braking device according to the disclosure.

Alternative exemplary embodiments are illustrated in FIGS. 8 and 9. Unchanged components, features and functions are generally denoted by the same reference sign. In order to distinguish between the exemplary embodiments, the letters a to c have been added to the reference signs of the exemplary embodiments. The following description is limited substantially to the differences from the first exemplary embodiment in FIGS. 1 to 7, wherein reference can be made to the description of the first exemplary embodiment in FIGS. 1 to 7 with regard to unchanged components, features and functions.

FIG. 8 shows an alternative power tool braking device 10b arranged in a gear housing 76b of an angle grinder 60b. The power tool braking device 10b comprises a magnetic field braking unit 14b, which is formed as an eddy current brake 26b. The power tool braking device 10b further comprises a mechanical activation unit 16b. The mechanical activation unit 16b has a structure similar to the mechanical activation unit 16a from FIG. 2. The activation unit 16b is provided to change a characteristic of a magnetic field of the magnetic field braking unit 14b as a result of a relative movement. The magnetic field braking unit 14b comprises a braking element 18b, which is formed as a first permanent magnet 20b and is connected in a rotationally engaged manner to an output element 44b of an output unit 42b of the power tool braking device 10b, said output element being formed as a crown gear 82b. The magnetic field braking unit 14b also comprises a braking element 24b, which is formed as a second permanent magnet 22b and is connected in a rotationally engaged manner to an output element 46b of the output unit 42b, said output element being formed as an entraining element 92b. The entraining element 92b is formed from a magnetically conductive material, such as a ferromagnetic material. A magnetic field of the second permanent magnet 22b can thus be intensified in the region of the second permanent magnet 22b and leakage fluxes can be kept low.

The permanent magnets 20b, 22b are tubular. In this case, the first permanent magnet 20b is arranged on a collar 124b of the crown gear 82b by means of an interference element 40b. The collar 124b is arranged along a circumferential direction 80b along a total circumference of the crown gear 82b. The circumferential direction 80b runs in a plane running perpendicularly with respect to an axis of rotation 108b of the crown gear 82b. The collar 124b also extends perpendicularly with respect to a side 100b facing away from a toothing 98b in a direction directed away from the toothing. The second permanent magnet 22b is arranged on an outer circumference of the entraining element 92b extending along the circumferential direction 80b. The permanent magnets 20b, 22b are thus arranged at a distance from one another radially along a direction perpendicular with respect to the axis of rotation 108b. The magnetic field braking unit 14b further comprises a further braking element 34b formed as an eddy current element 36b. The eddy current element 36b is arranged between the permanent magnets 20b, 22b along the direction perpendicular with respect to the axis of rotation 108b. Furthermore, the eddy current element 36b is formed from an electrically conductive material, such as aluminum and/or copper. The activation unit 16b changes a pole position of the first permanent magnet 20b relative to the second permanent magnet 22b. With regard to a function of the activation unit 16b and a function of the magnetic field braking unit 14b formed as an eddy current brake 26b, reference can be made to the description of FIGS. 1 to 7.

Furthermore, the magnetic field braking unit 14b is formed together with the activation unit 16b and the output unit 42b as an assembly module 54b. The assembly module 54b thus forms the power tool braking device 10b.

FIG. 9 shows a further alternative power tool braking device 10c arranged in a gear housing 76c of an angle grinder 60c. The power tool braking device 10c comprises a magnetic field braking unit 14c, which is formed as a hysteresis brake 28c. Furthermore, the power tool braking device 10c comprises a mechanical activation unit 16c. The mechanical activation unit 16c has a structure similar to the mechanical activation unit 16a from FIG. 2. The activation unit 16c is provided to change a characteristic of a magnetic field of the magnetic field braking unit 14c as a result of a relative movement. The magnetic field braking unit 14c also has a substantially similar structure compared to the structure of the magnetic field braking unit 14a from FIG. 2. The magnetic field braking unit 14c comprises a braking element 18c, which is formed as a first permanent magnet 20c and is connected in a rotationally engaged manner to an output element 44c of an output unit 42c of the power tool braking device 10c, said output element being formed as a crown gear 82c. Furthermore, the magnetic field braking unit 14c comprises a braking element 24c, which is formed as a second permanent magnet 22c and is connected in a rotationally engaged manner to an output element 46c of the output unit 42c, said output element being formed as an entraining element 92c. Furthermore, the magnetic field braking unit 14c comprises a further braking element 34c formed as a hysteresis element 126c. The hysteresis element 126c is arranged axially between the first permanent magnet 20c and the second permanent magnet 22c along an axis of rotation 108c of the crown gear 82c. It is also conceivable however for the hysteresis element 126c to be arranged between the permanent magnets 20c, 22c along a direction perpendicular to the axis of rotation 108c (see FIG. 8).

In a braking mode of the magnetic field braking unit 14c, like-directed polarities of angular segments of the first permanent magnet 20c and of angular segments of the second permanent magnet 22c are arranged opposite one another, as considered along the axis of rotation 108c of the crown gear 82c. In this case, a magnetic field of the permanent magnets 20c, 22c acts on the hysteresis element 126c. A line of flux is thus generated along a circumferential direction 80c in the hysteresis element 126c. The line of flux generates a torque, which counteracts a rotational movement of the permanent magnets 20c, 22c rotating with a spindle 86c of the output unit 42c. The permanent magnets 20c, 22c are thus braked. The torque for braking the permanent magnets 20c, 22c generates a retaining force acting on the permanent magnets 20c, 22c when the permanent magnets 20c, 22c come to a standstill. The magnetic field braking unit 14c formed as a hysteresis brake 28c can thus be used as a holding brake. In one operating mode, oppositely directed polarities of the angular segments 116c, 118c of the first permanent magnet 20c and of the angular segments of the second permanent magnet 22c are arranged opposite one another, as considered along the axis of rotation 108c of the crown gear 82c. Low magnetic forces of a magnetic field of the permanent magnets 20c, 22c act on the hysteresis element 126c. In this case, a line of flux runs perpendicularly along the axis of rotation 108c and through the hysteresis element 126c.

Furthermore, the magnetic field braking unit 14c together with the activation unit 16c and the output unit 42c is formed as an assembly module 54c. The assembly module 54c thus forms the power tool braking device 10c.

The invention claimed is:

1. A power tool braking device of a portable power tool comprising:
   at least one magnetic field braking unit having at least two braking elements; and
   at least one output unit including at least one output element, on which at least one braking element of the magnetic field braking unit is supported,
   wherein the at least two braking elements are permanent magnets configured to provide a braking force based on the magnetic field between the braking elements, and
   wherein the at least one output unit includes two output elements rotatable with each other and each of the braking elements is supported on a corresponding one of the two output elements.

2. The power tool braking device as claimed in claim 1, wherein the at least one output unit includes a bevel gear.

3. The power tool braking device as claimed in claim 2, wherein the at least one magnetic field braking unit is positioned at least in part after an input gearwheel of the bevel gear along a flux of force.

4. The power tool braking device as claimed in claim 1, further comprising at least one mechanical activation unit configured to change at least one characteristic of a magnetic field of the at least one magnetic field braking unit by relative movement of said braking elements.

5. The power tool braking device as claimed in claim 4, wherein the at least one mechanical activation unit is configured to change a pole position of the permanent magnets of the braking elements relative to each other.

6. The power tool braking device as claimed in claim 1, wherein the at least one magnetic field braking unit includes an eddy current brake.

7. The power tool braking device as claimed in claim 1, wherein the at least one magnetic field braking unit includes a hysteresis brake.

8. A hand-held power tool, comprising:
   a power tool braking device including at least one magnetic field braking unit and at least one output unit,
   wherein the at least one magnetic field braking unit has at least two braking elements;
   wherein the at least two braking elements are permanent magnets configured to provide a braking force based on the magnetic field between the braking elements, and
   wherein the at least one output unit includes two output elements rotatable with each other and each of the braking elements of the magnetic field braking unit is supported on a corresponding one of the two output elements.

* * * * *